Jan. 30, 1945.   L. J. DE LANTY ET AL   2,368,119
FLAW DETECTOR MEANS
Filed Nov. 5, 1940   3 Sheets-Sheet 1

INVENTORS
LOREN J. DE LANTY
WILLIAM A. WILLIAMS
BY Joseph H. Lipschutz
ATTORNEY

Jan. 30, 1945. L. J. DE LANTY ET AL 2,368,119
FLAW DETECTOR MEANS
Filed Nov. 5, 1940 3 Sheets-Sheet 3

INVENTORS
LOREN J. DE LANTY
WILLIAM A. WILLIAMS
BY Joseph H. Lipschitz
ATTORNEY

Patented Jan. 30, 1945

2,368,119

UNITED STATES PATENT OFFICE 2,368,119

FLAW DETECTOR MEANS

Loren J. De Lanty, Spring Valley, N. Y., and William A. Williams, Grayville, Ill., assignors to Sperry Products, Inc., Hoboken, N. J., a corporation of New York Application November 5, 1940, Serial No. 364,362

5 Claims. (Cl. 175—183)

This invention relates to flaw detector means for electric conductors and is especially adapted for testing airplane struts or tie rods and similar objects. One of the principal objects of the invention is to provide such a testing device which can be readily adapted to the testing of struts of varying lengths, thicknesses and end diameters.

Another important object of this invention relates to means for making rapid electric connections between the source of current to be passed through the struts and the ends of the struts, regardless of the varying dimensions of the struts and their end members.

Still another object of this invention is to provide means whereby the struts may be quickly mounted in testing position.

Still another object of this invention is to provide novel detector means adapted to respond to differences in electric potential between points along the length of the struts with a view to obtaining the maximum output from the responsive means for any given defect.

Still further objects and advantages of this invention will become apparent in the following detailed description thereof.

In the accompanying drawings.

Figure 7:
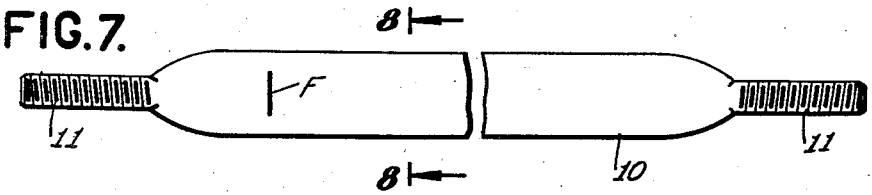
Figs. 7 and 8 are a plan view and a cross section of a typical strut designed to be tested by this machine.
Figure 8:
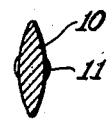

Referring first to Figs. 7 and 8, there is shown a type of metallic conductor for the testing of which our machine is especially adapted. It will be understood that this invention is not limited to the testing of airplane struts alone, but applies equally well to a large number of similar articles. However, the invention is to be described hereinafter with reference to the airplane strut 10 which has the general shape in plan shown in Fig. 7 and which in section is substantially elliptic as shown in Fig. 8. The strut terminates in screw threaded portions 11. The struts vary in length, width, and shape, and therefore create a special problem in testing the same for defects such as the transverse fissure F shown in Fig. 7. While various means for testing devices of this type have been proposed, we have found that the only practical form consists in sending current through the strut from one end thereof to the other and measuring the potential drop from point to point along the length thereof.

Our invention, therefore, consists broadly in two general parts, as follows: The first consists in providing a supporting mechanism for the strut which will enable the strut to be quickly placed in position for testing in such manner that current may be passed therethrough regardless of the variations in length, width and cross-section of the particular strut being tested. Second, our invention consists in providing a special detector mechanism which will yield a higher output with less leakage for any given defect than has heretofore been possible.

For accomplishing the first of these objects, the entire testing device is adapted to be mounted upon a table 15 upon which there are mounted two strut supports 16 and 17. The strut support at one end, for instance, the support 16, may be mounted on a base 16' fixed to the table, while the strut support 17 is mounted on a base 17' movable on the table. Such movement may be guided by a lug 34 operating in a longitudinal slot 33 in the table. The base 17' is moved until it is approximately the right distance from base 16' to accommodate the strut to be tested, and then base 17' is locked to the table. For this purpose, a handle 50 may be provided on a shaft 51 having beveled gear engagement 52 and 53 with a stem 54 into which is screwed a pin 55 extending through the table 15. A square lock-nut 56 in a similar shaped opening in the table prevents the pin 55 from rotating, and therefore rotation of shaft 54 after handle 50 is turned serves to move pin 55 upwardly or downwardly to cause a flange 57 carried at the outer end of said pin to engage or disengage the table 15. To lock base 17' to the table, the flange 57 is caused to engage said table firmly.

Figure 1:
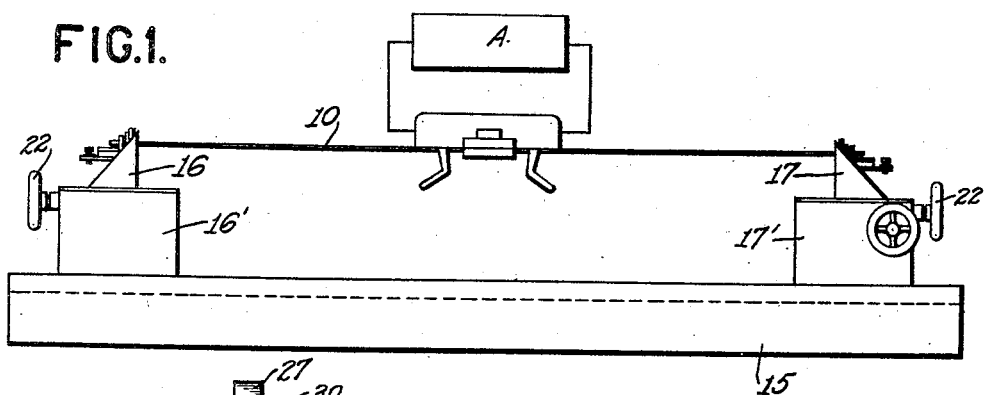
Fig. 1 is a front elevation showing a general assembly of our machine embodying our invention.
Figure 2:
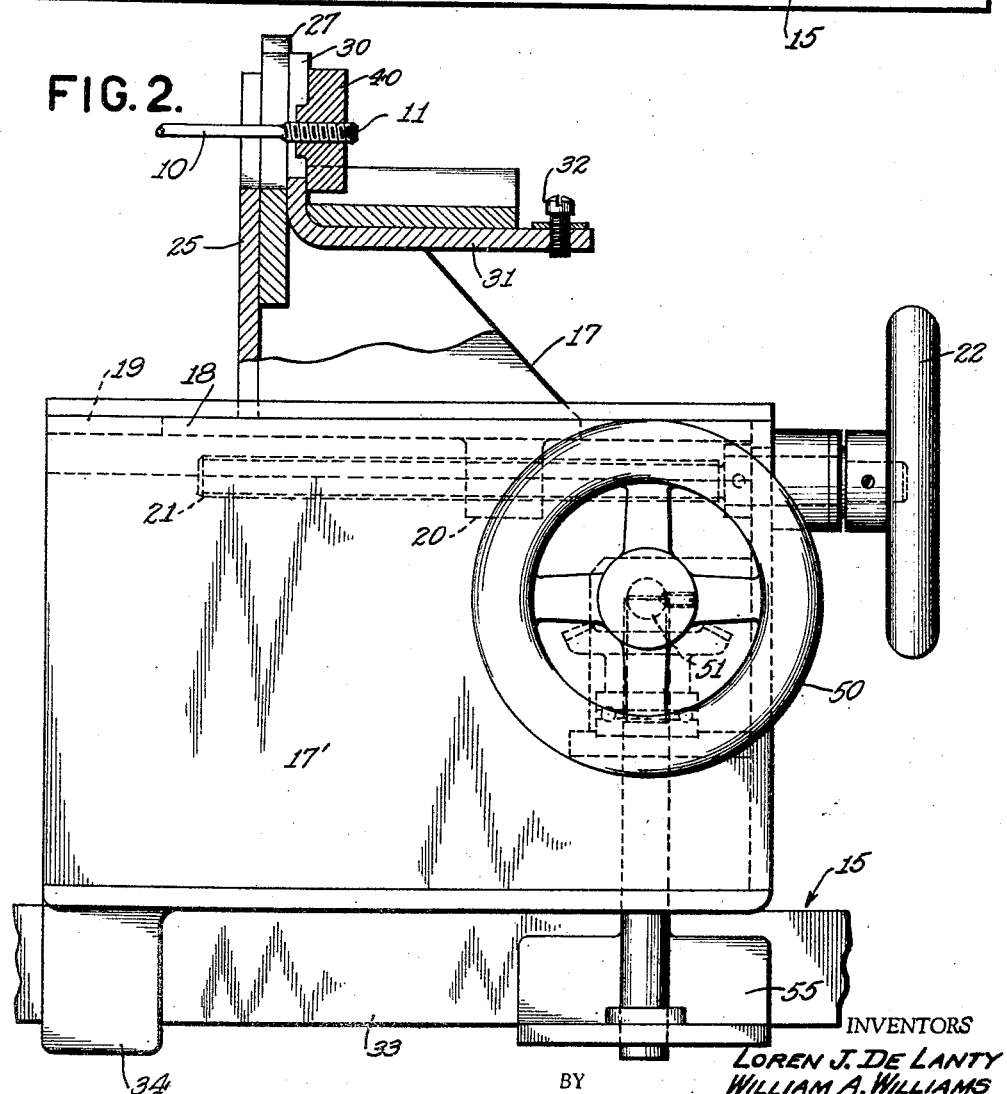
Fig. 2 is a front elevation of an enlarged detail of one end of the strut holding mechanism.
Figure 3:
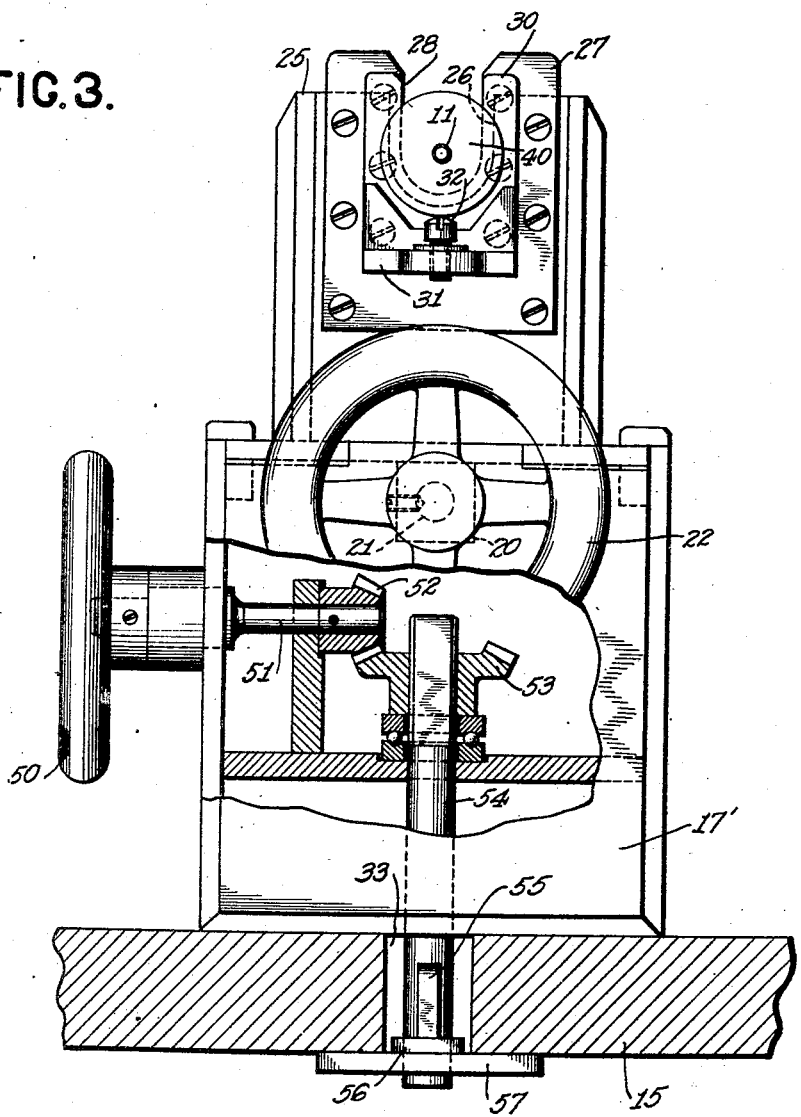
Fig. 3 is an end elevation of the Fig. 2 portion of the machine.

When base 17' has been locked to the table at approximately the correct distance from 16' to accommodate the strut to be tested, the strut is positioned on supports 16 and 17. In each support member 16, 17, there is a main bracket 25 substantially perpendicular to the plane of the table provided with a U-shaped opening 26 (see Fig. 3). Back of said opening there is provided a plate 27 having a similar U-shaped opening 28 within the U-shaped opening 26. The threaded ends 11 of the strut 10 are adapted to rest within the U-shaped openings 28 in the supports 16 and 17 respectively, and the problem is to effect electrical contact with said ends in order to pass current through the struts. This is best effected by means of plates 30 of high electric conductivity, such as copper, fastened behind the plates 27 and having a U-shaped opening coinciding with the U-shaped opening in plate 27 and said plates 30 being L-shaped and having a rearwardly extending portion 31 with a current contact clamp 32 fastened to the outer end thereof. The threaded end 11 of the strut rests within the U-shaped opening 28 and the current contact is effected between said threaded end and the copper contact plate 30 by means of a nut 40 adapted to be quickly screw-threaded upon the end 11 into firm engagement with the copper plate 30. The current now passes through contact 32, copper plate extension 31, plate 30, the nut 40, which is also of highly conductive material, to the threaded end 11 of the strut. Since this arrangement is duplicated in the opposite support there is now obtained a path of high electric conductivity extending through the strut by means of the effective current clamping means just described. It will be seen that current engagement between the ends 11 of strut 10 and the contact plate 30 may be rapidly effected merely by screwing the nut 40 on to the threaded end 11 of the strut 10 and then effecting firm engagement between the nut 40 and the plate 30. The latter engagement is quickly effected by operating one of the handles 22 (depending upon the position of the operator) to move the support 16 or 17 away from the other support until the nuts 40 on both ends of the strut are in firm engagement with their respective plates 30. For this purpose each support 16 and 17 is provided with a lug 18 (see Fig. 2) which extends downwardly through a slot 19 extending longitudinally in the table, whereby the support 17 may be moved toward or away from the support 16 in order to effect firm contact between plates 30 and the nuts 40. The longitudinal movement of the support 16 or 17 relative to the bases 16' or 17' may be accomplished by means of a depending lug 20 having a screw threaded opening therein in which operates a screw 21 which projects out of the end of the table and may be provided with an operating handle 22 so that screw 21 may be turned by turning handle 22 in one direction or the other to cause support 16 or 17 to approach or move away from the other support.

Current from any suitable source may be supplied to the contacts 32 to pass current through the strut which is now supported in testing position, and any variations in potential drop lengthwise of the strut which may be caused by the presence of defects are detected by means of a potential drop measuring device of special design. The current which is supplied to the strut is preferably A. C. of a frequency selected to detect defects of a predetermined depth. Thus, for the detection of surface fatigue cracks, 90 cycle A. C. is preferable. The advantage in using A. C. lies in the fact that such current stays near the surface, and therefore the volume of material penetrated by the current is much less than when D. C. is used since the latter penetrates the entire cross-section. Hence, a defect will affect a larger percentage of the total volume through which A. C. is passing than would be the case if D. C. were used. However, if deep internal defects are to be detected it may be necessary to employ D. C.

Figure 4:
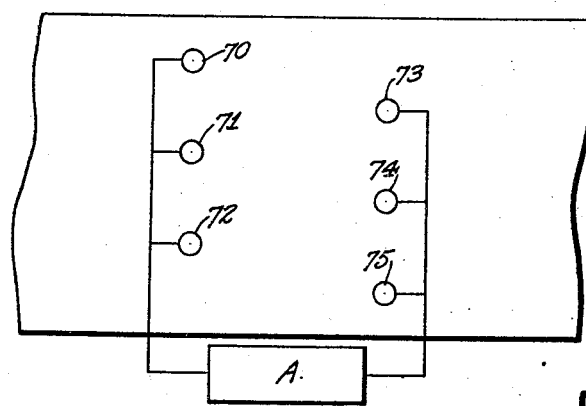
Fig. 4 is a bottom view of the potential drop measuring device for detecting transverse defects.
Figures 5, 6:
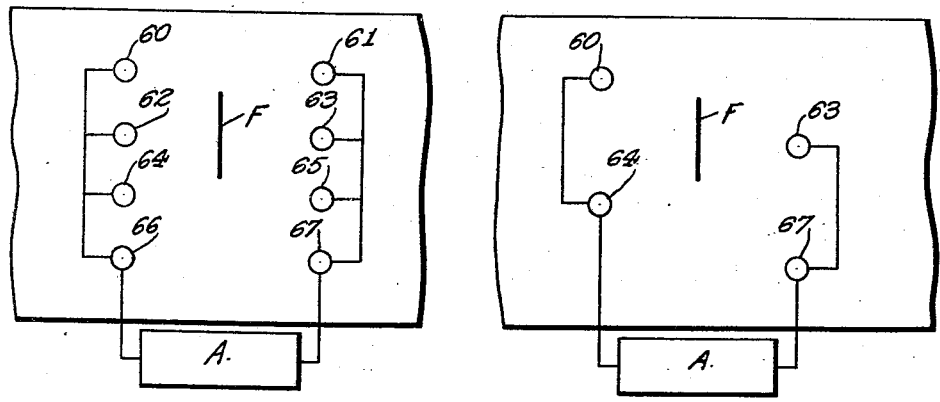
Figs. 5 and 6 are two views illustrating the theory of this invention.

The potential drop measuring device is shown in Fig. 4 and comprises two series of potential contacts arranged in parallel and the outputs thereof extending into an amplifier A. It will be seen that the contacts of one set are arranged in staggered relation with respect to the contacts of the other set. This constitutes a novel construction which yields results not heretofore obtained. The reason for this will be disclosed by a study of the diagrammatic Figures 5 and 6. Referring to Fig. 5, it will be seen that contacts are arranged in the conventional manner with each set of contacts arranged in line transversely with respect to the longitudinal axis of the strut. Each pair of contacts, as for instance, contacts 60, 61, is in a line parallel to the longitudinal axis of the conductor under test. In this arrangement, if a fissure F is encountered there will be an increased drop in potential between contacts 62 and 63, but the current, trying to find easier paths, will very readily be able to find shorter paths between contacts 60, 64 and 66 on the one side and contacts 61, 65 and 67 on the other side. In other words, in the arrangement shown, there are at least half a dozen short-circuiting paths which the current may follow in preference to the high resistance path between contacts 62 and 63. Much of the current does take the easier path and therefore there results a lesser output due to greater leakage, as a result of the plurality of short circuit paths, than might otherwise have been obtained had these paths not been present. If, now, the contacts are arranged in staggered relation as shown in Fig. 6, then it will be apparent that the same coverage can be obtained as in Fig. 5 with half the number of contacts, and therefore with a much smaller number of short circuiting paths. If we eliminate contacts 61, 62, 65 and 66, it will be seen that the same coverage is obtained as before, but the number of short circuiting paths has been greatly reduced. The increased drop in potential will be apparent between contacts 60 and 63 and the only short circuiting path which is present in this particular instance will be that which exists between contacts 64 and 67. In this manner a much simpler potential drop responsive mechanism is made possible where but half the number of contacts are employed, while nevertheless the same coverage is obtained with a higher output for any given fissure as a consequence of fewer short circuiting or leakage paths.

In accordance with this novel theory, we utilize the potential drop responsive construction disclosed in Fig. 4 wherein the six contacts shown perform the duty which heretofore would require twelve, but nevertheless yield a higher output by reason of fewer leakage paths. The pairs of contacts are arranged in staggered relation and the outputs therefrom are connected to the amplifier A, as shown. The set of contacts 70, 71, 72 is connected in parallel as is the set of contacts 73, 74, 75, and each contact may cooperate with one or more of the contacts in the other side diagonally opposite.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other equivalent means. Also, while it is designed to use the various features and elements in the combination and relation described, some of these may be altered and others omitted without interfering with the more general results outlined, and the invention extends to such use.

Having described our invention, what we claim and desire to secure by Letters Patent is:

1. In a flaw detector mechanism for electrical conductors, means for passing current through said conductor along a predetermined current axis, and means for detecting variations in the current caused by defects in said conductor, said last-named means comprising two sets of contacts, one set spaced from the other set along the current axis, each contact of one set cooperating with the respective contact in the other set to form a pair of contacts for measuring potential drop along the current axis, the contacts of one set being staggered with respect to the contacts of the other set.

2. In a flaw detector mechanism for elongated conductors such as struts and the like, a source of current, means for supporting struts of different lengths under tension and effecting electrical contact between said struts and said support, said means comprising relatively movable supports of conductive material in electrical engagement with said current source, each support having an aperture large enough to support struts of various dimensions, end members of conductive material adapted to be mounted on the ends of the struts in electrical contact therewith and positioned outside of said supports so that movement of said supports away from each other causes the strut to be subjected to tension, and means whereby said supports are adapted to be moved relatively to effect contact between said end members and said supports.

3. In a flaw detector mechanism for elongated conductors such as struts and the like, a source of current, means for supporting struts of different lengths under tension and effecting electrical contact between said struts and said support, said means comprising relatively movable supports of conductive material in electrical engagement with said current source, each support having a U-shaped aperture large enough to support struts of various dimensions, end members of conductive material adapted to be mounted on the ends of the struts in electrical contact therewith and positioned outside of said supports so that movement of said supports away from each other causes the strut to be subjected to tension, and means whereby said supports are adapted to be moved relatively to effect contact between said end members and said supports.

4. In a flaw detector mechanism for elongated conductors such as struts and the like, a source of current, means for supporting struts of different lengths under tension and effecting electrical contact between said struts and said support, said means comprising relatively movable supports of conductive material in electrical engagement with said current source, each support having a U-shaped aperture large enough to support struts of various dimensions, said struts having their ends threaded, end members of conductive material adapted to be threaded on the ends of the struts in electrical contact therewith and positioned outside of said supports so that movement of said supports away from each other causes the strut to be subjected to tension, and means whereby said supports are adapted to be moved relatively to effect contact between said end members and said supports.

5. In a flaw detector mechanism for electrical conductors, means for passing current through said conductor along a predetermined axis, and means for detecting variations in the current caused by defects in said conductor, said last named means comprising a plurality of sets of contacts so positioned that lines joining each contact of one set with every contact of the other set will all be angularly displaced with respect to the current axis.

LOREN J. DE LANTY.
WILLIAM A. WILLIAMS.